United States Patent [19]

Hekmati et al.

[11] Patent Number: 5,102,613

[45] Date of Patent: Apr. 7, 1992

[54] RADIAL BRAKE ASSEMBLY FOR A CONTROL ROD DRIVE

[75] Inventors: Alireza Hekmati; Edward Y. Gibo, both of San Jose, Calif.

[73] Assignee: General Electric Company, San Jose, Calif.

[21] Appl. No.: 623,328

[22] Filed: Dec. 6, 1990

[51] Int. Cl.⁵ .............................................. G21C 7/14
[52] U.S. Cl. ..................................... 376/242; 376/235
[58] Field of Search ................ 376/232, 235, 242, 227

[56] References Cited

U.S. PATENT DOCUMENTS

| | | | |
|---|---|---|---|
| 2,080,544 | 5/1937 | Naugler | 192/148 |
| 3,278,385 | 10/1966 | Dufrane | 376/232 |
| 3,410,381 | 11/1968 | Henshaw et al. | 192/148 |
| 3,785,923 | 1/1974 | Bratoljic et al. | 376/227 |
| 3,945,514 | 3/1976 | Dose | 214/27 |
| 4,044,622 | 8/1977 | Matthews | 376/235 |
| 4,238,288 | 12/1980 | Anikin et al. | 376/232 |
| 4,423,002 | 12/1983 | Wiart et al. | 376/227 |
| 4,518,559 | 5/1985 | Fischer et al. | 376/230 |
| 4,624,825 | 11/1986 | Martin et al. | 376/227 |
| 4,661,307 | 4/1987 | Guillot | 376/232 |

Primary Examiner—Brooks H. Hunt
Assistant Examiner—Frederick H. Voss
Attorney, Agent, or Firm—Robert R. Schroeder

[57] ABSTRACT

A radial brake assembly is disclosed for selectively preventing rotation of a shaft, such as a shaft used in a control rod drive for a nuclear reactor. The brake assembly includes a stationary housing, a rotor disc fixedly connected to the shaft for rotation therewith, and a brake member disposed adjacent to the perimeter of the rotor disc. The rotor disc includes at least one rotor tooth and the brake member includes at least one braking tooth. The brake member is selectively positioned in a deployed position for allowing the braking tooth to contact the rotor tooth for preventing rotation of the shaft in a first direction, and in a retracted position for allowing the rotor disc and shaft to rotate without restraint from the brake member.

12 Claims, 6 Drawing Sheets

RADIAL BRAKE ASSEMBLY FOR A CONTROL ROD DRIVE

CROSS-REFERENCE TO RELATED APPLICATION

The present invention is related to U.S. patent application Ser. No. 07/559,743, filed 30 July 1990, entitled "Brake Assembly for a Control Rod Drive," by K. J. Jamrus et al, commonly owned by the present assignee.

TECHNICAL FIELD

The present invention relates generally to control rod drives used in nuclear reactors and, more specifically, to a brake assembly effective for preventing rotation of the control rod drive when engaged.

BACKGROUND ART

In one type of nuclear reactor, control rods are selectively inserted and withdrawn from a nuclear reactor vessel for controlling the operation thereof. Each of the control rods is typically positioned by a conventional control rod drive which includes a ball screw or spindle operatively engaging a ball nut for raising and lowering the ball nut as the spindle is rotated either clockwise or counterclockwise. A hollow piston rests upon the ball nut at one end thereof and at its other end is conventionally joined to the control rod. Displacement of the ball nut provides displacement of the hollow piston which in turn inserts or withdraws the control rod in the reactor vessel.

In order to achieve faster insertion of the control rod than could be obtained by normal rotation of the ball spindle, which is conventionally referred to as a scram operation, a rapid flow of high-pressure water is injected through the control rod drive past the piston for lifting the piston off the ball nut in a relatively short time for quickly inserting the control rod into the reactor vessel. The high-pressure water is channeled to the control rod drive through a scram line pipe attached to a high-pressure water accumulator.

In one type of occurrence which allows for rapid backflow of the water past the piston, due to, for example, a break in the scram line, the backflow may cause a large reverse pressure on the piston which in turn provides a back force on the control rod ball nut. This back force can cause reverse rotation of the ball spindle with corresponding withdrawal of the control rod. Withdrawal of one of the control rods due to such a backflow occurrence may cause damage to adjacent fuel in the reactor vessel, requiring replacement thereof leading to undesirable down time of the reactor and economic losses.

In order to prevent the above occurrence, a conventional electromechanical brake is provided in the control rod drive for holding the ball spindle from rotating unless the brake is energized. The brake is sized for restraining rotation of the ball spindle against such forces due to backflow of water over the piston when the control rod drive motor is not operating. And, when the control rod drive motor is operating, the motor itself is sized for providing adequate torque for resisting the forces due to the backflow of water in the event of the above-described occurrence. The motor is also sized to ensure that it may cause the control rod to be inserted even in the event that the brake fails in its engaged position to ensure effective control and/or shutdown of the reactor.

To ensure operability of the brake, the brake is periodically tested. However, the brake is located adjacent to the reactor vessel, which is inaccessible during operation of the reactor due to the radiation field emanating from the reactor vessel. The radiation field continues at reduced levels also during shutdown of the reactor, which would require inspectors to wear suitable protective clothing and limit their time in the area. In one nuclear reactor embodiment, there are about 205 control rod drives, including a respective number of brakes, which would necessarily require a substantial amount of time for testing all of the brakes. Testing of the brakes during reactor shutdown would, therefore, be relatively costly to accomplish, which is additionally economically undesirable since the reactor is not operating for producing power.

Since conventional electromechanical brakes typically utilize braking pads for restraining rotation of a rotor disc, they are subject to slippage. Slippage can result in undesirable partial withdrawal of the control rod during backflow occurrence, and also requires additional means for effectively testing the torque-resisting capability of the brake.

OBJECTS OF THE INVENTION

Accordingly, one object of the present invention is to provide a new and improved brake assembly for preventing rotation of a shaft.

Another object of the present invention is to provide a brake assembly effective for providing a positive rotational restraint of the shaft in one direction while allowing rotation thereof in an opposite direction.

Another object of the present invention is to provide a relatively simple and compact brake assembly for a shaft.

Another object of the present invention is to provide a brake assembly which is relatively easily testable.

Another object of the present invention is to provide a brake assembly for preventing rotation of a control rod drive for a nuclear reactor and which may be actuated and tested remotely.

DISCLOSURE OF INVENTION

A brake assembly is disclosed for selectively preventing rotation of a shaft, such as a shaft used in a control rod drive for a nuclear reactor. The brake assembly includes a stationary housing, a rotor disc fixedly connected to the shaft for rotation therewith, and a brake member disposed adjacent to the perimeter of the rotor disc. The rotor disc includes at least one rotor tooth and the brake member includes at least one braking tooth. Means are disclosed for selectively positioning the brake member in a deployed position for allowing the braking tooth to contact the rotor tooth for preventing rotation of the shaft in a first direction, and in a retracted position for allowing the rotor disc and shaft to rotate without restraint from the brake member.

BRIEF DESCRIPTION OF DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawing in which:

MODE(S) FOR CARRYING OUT THE INVENTION

Figures 1, 2:
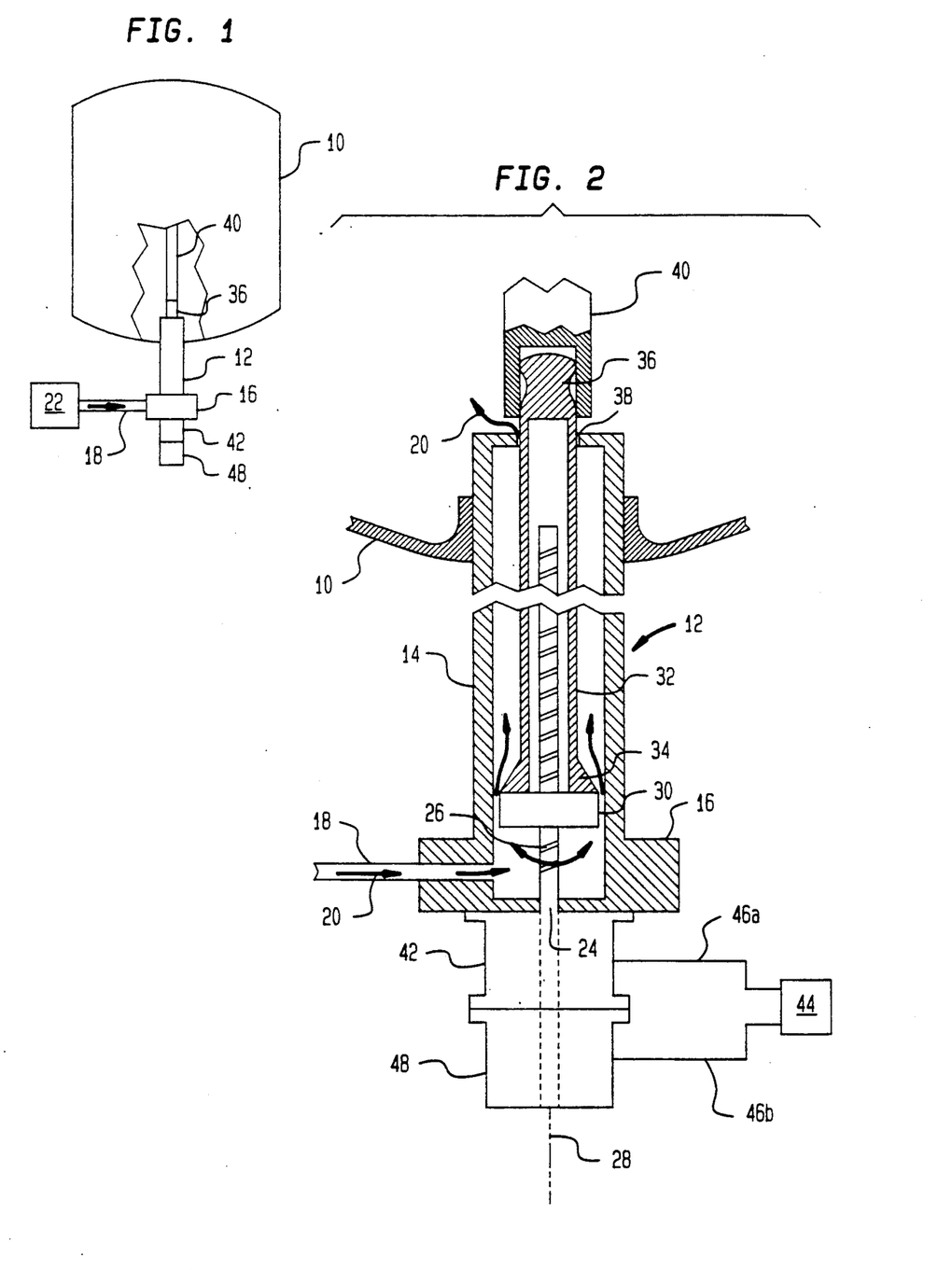
FIG. 1 is a schematic representation of a nuclear reactor vessel including a control rod drive having a brake assembly in accordance with one embodiment of the present invention.
FIG. 2 is an enlarged sectional view, partly schematic, of the control rod drive illustrated in FIG. 1.

Illustrated in FIGS. 1 and 2 is an exemplary nuclear reactor vessel 10 having a plurality of fine motion control rod drives 12 (FMCRD), only one of which is shown. In one exemplary embodiment, there are 205 FMCRDs 12 extending into the vessel 10 through the bottom thereof. The rod drive 12 includes a tubular housing 14 extending outwardly from the vessel 10 and conventionally secured thereto. The housing 14 is conventionally connected to a flange 16 which is disposed in flow communication with a scram line or conduit 18 which is conventionally selectively provided with high-pressure water 20 from a conventional high-pressure water accumulator 22 conventionally joined to the scram line 18.

Conventionally disposed inside the housing 14 is a conventional ball screw or spindle 24, which in this exemplary embodiment includes conventional right-handed threads 26. The control rod drive 12 includes a longitudinal centerline axis 28, with the housing 12 and spindle 24 being disposed coaxially therewith.

A conventional ball nut 30 is positioned over the spindle 24 and is conventionally restrained from rotating therewith so that as the spindle is rotated in a clockwise direction, the ball nut is translated in a downward direction away from the vessel 10, and when the spindle is rotated in a counterclockwise direction, the ball nut 30 is translated in an upward direction toward the vessel 10. A conventional hollow, elongate piston 32 is disposed coaxially with the spindle 24 and includes a conical base end 34 which rests on the ball nut 30, and a tip end 36 extending through a central aperture 38 in the outer end of the housing 14 into the vessel 10. The tip end 36 is conventionally coupled to a respective control rod 40 by a bayonet coupling, for example.

The spindle 24 extends downwardly from the flange 16 through a conventional electrical motor 42 which selectively rotates the spindle 24 in either the clockwise direction or counterclockwise direction. The motor 42 is electrically connected to a conventional control 44 by a conventional electrical line 46a for selectively controlling operation of the motor 42.

In accordance with the preferred embodiment of the present invention, the rod drive 12 further includes a radial brake assembly 48 joined to the motor 42 into which extends the spindle 24, also referred to as an input shaft 24. The brake assembly 48 is electrically joined to the control 44 by a conventional electrical line 46b for selectively braking and unbraking, or releasing, the input shaft 24.

Figure 3:
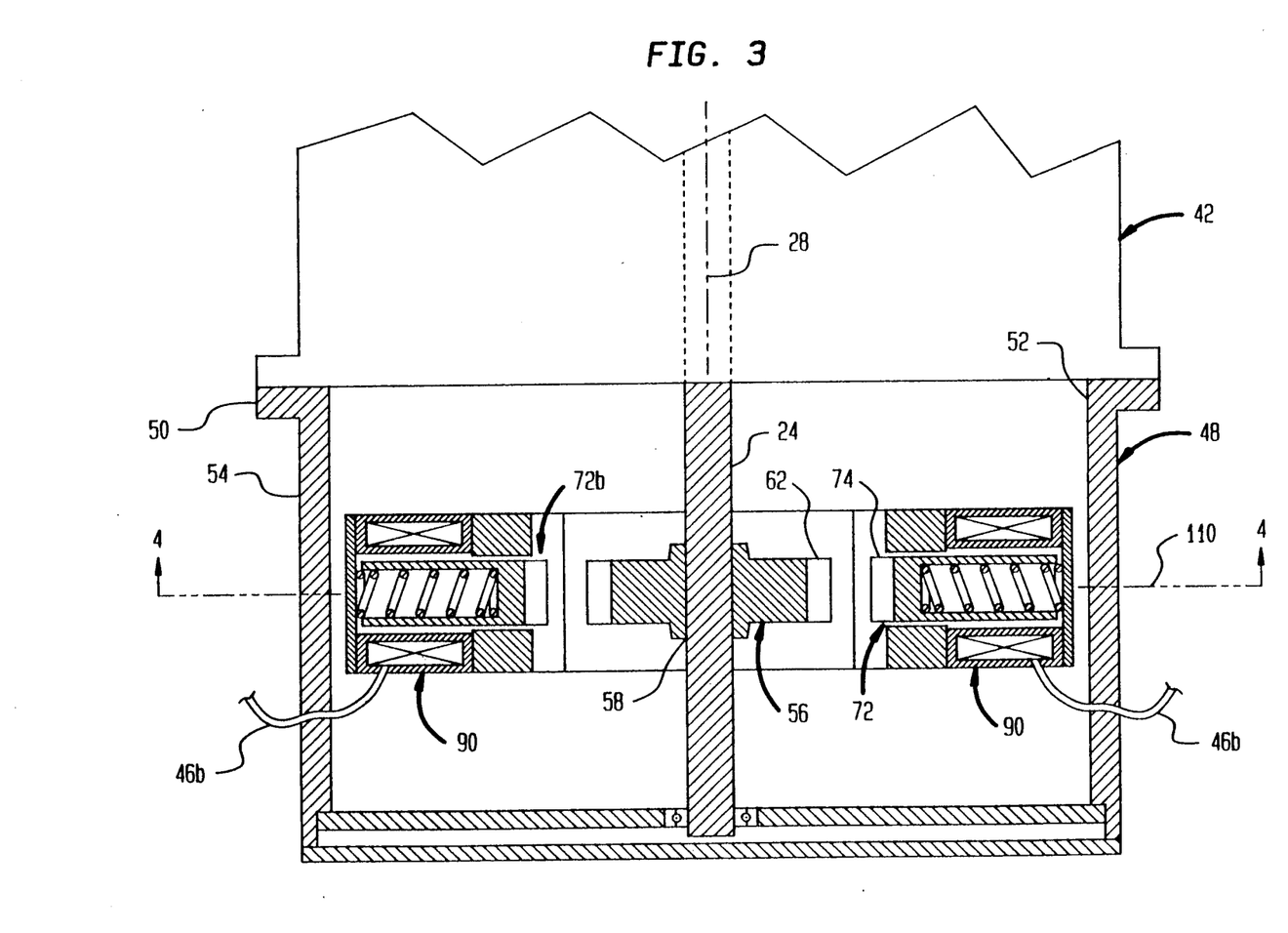
FIG. 3 is a longitudinal, transverse, partly sectional view of the brake assembly illustrated in FIGS. 1 and 2 in accordance with one embodiment of the present invention with a brake member disposed in a retracted position.

As illustrated in more particularity in FIG. 3, the brake assembly 48 includes an annular stationary base 50 conventionally fixedly secured to the motor 42, for example by bolts (not shown). The base 50 includes a central aperture 52 which receives a portion of the shaft 24 extending from the motor 42. Disposed coaxially with the shaft centerline axis 28 is an annular housing 54 of the brake assembly 48 which is conventionally fixedly secured to the base 50.

Figure 4:
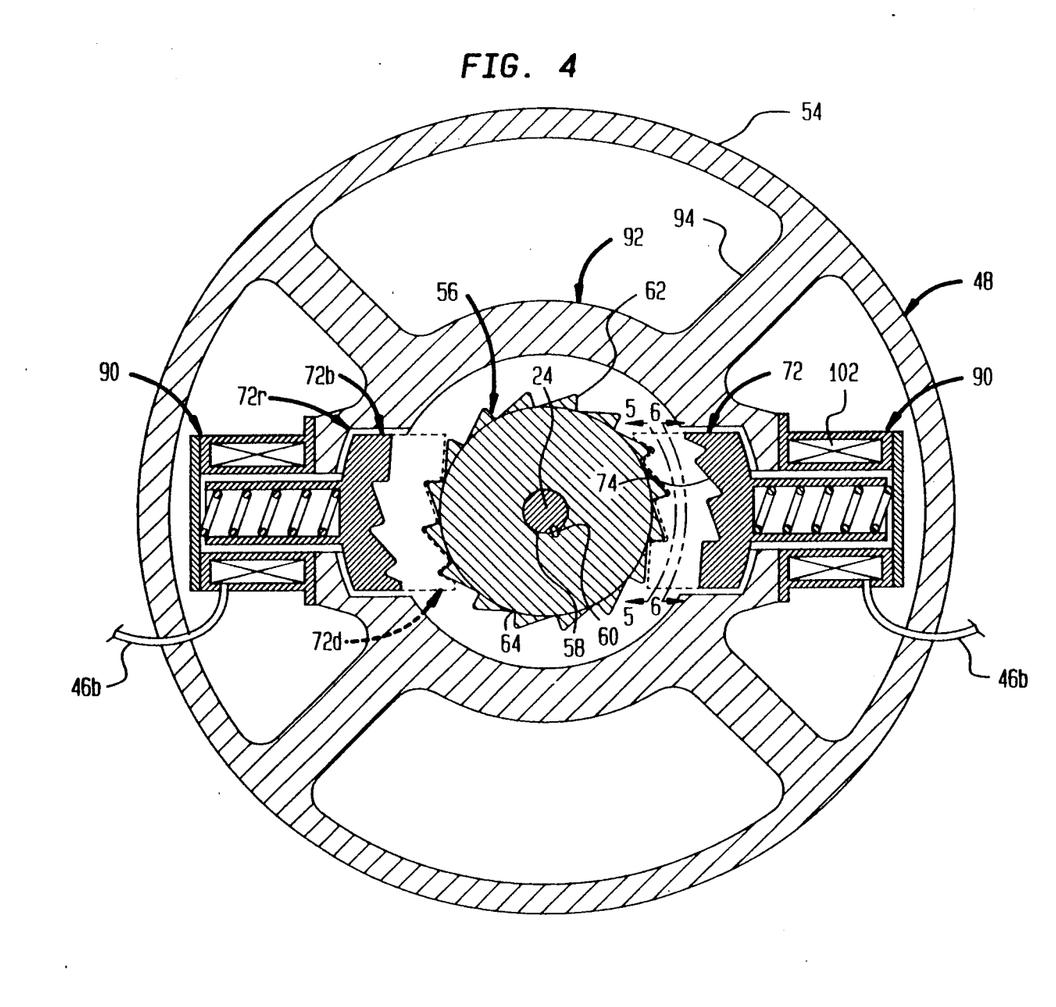
FIG. 4 is a transverse sectional view of the brake assembly illustrated in FIG. 3 taken along line 4—4 shown in solid line with the brake member disposed in a retracted position.

The brake assembly 48 further includes an annular rotor disc 56 having a central aperture 58, as shown in more detail in FIG. 4, surrounding the shaft 24 and fixedly connected to the shaft 24 for rotation therewith by a conventional key 60. The rotor disc 56 has at least one and preferably a plurality of rotor teeth 62 extending circumferentially around the rotor disc 56 and extending radially outwardly from a perimeter 64 of the rotor disc 56.

Figure 5:
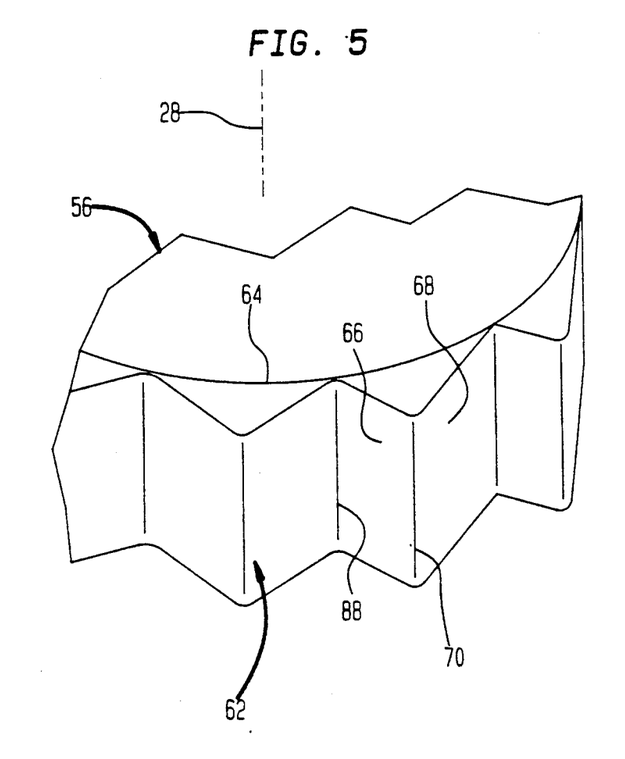
FIG. 5 is a perspective view of a portion of the rotor disc illustrated in FIG. 4 taken along line 5—5.

As illustrated in FIG. 5, each of the rotor teeth 62 includes a locking surface 66 which extends generally perpendicularly radially outwardly from the perimeter 64 and parallel to the centerline axis 28. Each rotor tooth 62 further includes an inclined surface 68 extending from the locking surface 66, and forming a peak 70 therewith, to the perimeter 64 in a circumferential direction relative to the centerline axis 28 and the perimeter 64.

A nonrotating brake member 72 as shown in FIGS. 3 and 4 is disposed adjacent to the rotor disc perimeter 64 and includes at least one braking tooth 74. In the preferred embodiment of the present invention illustrated in FIGS. 3 and 4, first and second brake members, designated 72 and 72b, are circumferentially spaced from each other at about 180° apart. The two brake members 72, 72b are preferably used for redundancy and for halving the braking force required from each of the brake members 72. The two brake members 72, 72b are preferably identical and, therefore, the description below with respect to the first brake member 72 applies also to the second brake member 72b.

Figure 6:
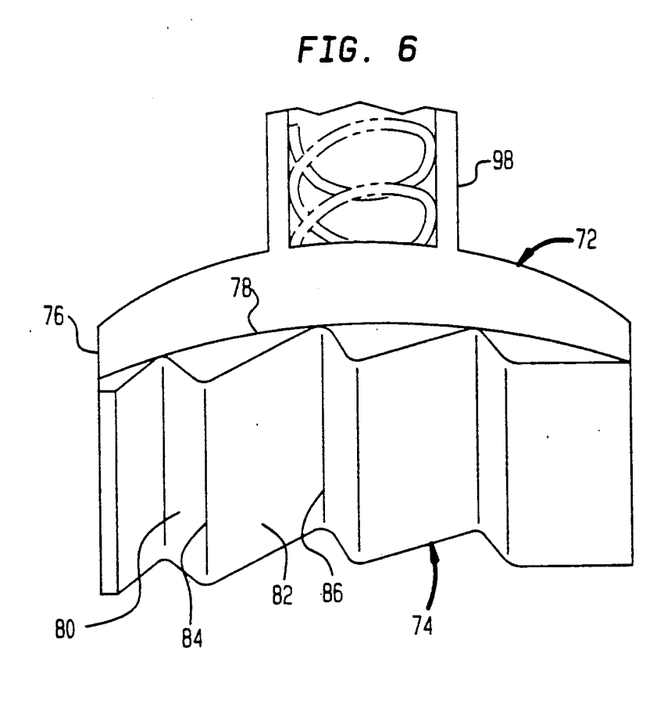
FIG. 6 is a perspective view of a portion of the brake member illustrated in FIG. 4 taken along line 6—6.

As illustrated in FIG. 6, the brake member 72 further includes an arcuate base 76 having an inner arc 78, from which the braking tooth 74 extends radially inwardly therefrom relative to the centerline axis 28. The braking tooth 74 further includes a locking surface 80 extending radially inwardly from the brake member inner arc 78, and an inclined surface 82 extending therefrom to form a peak 84, and also extending in a circumferential direction to the inner arc 78.

Figure 7:
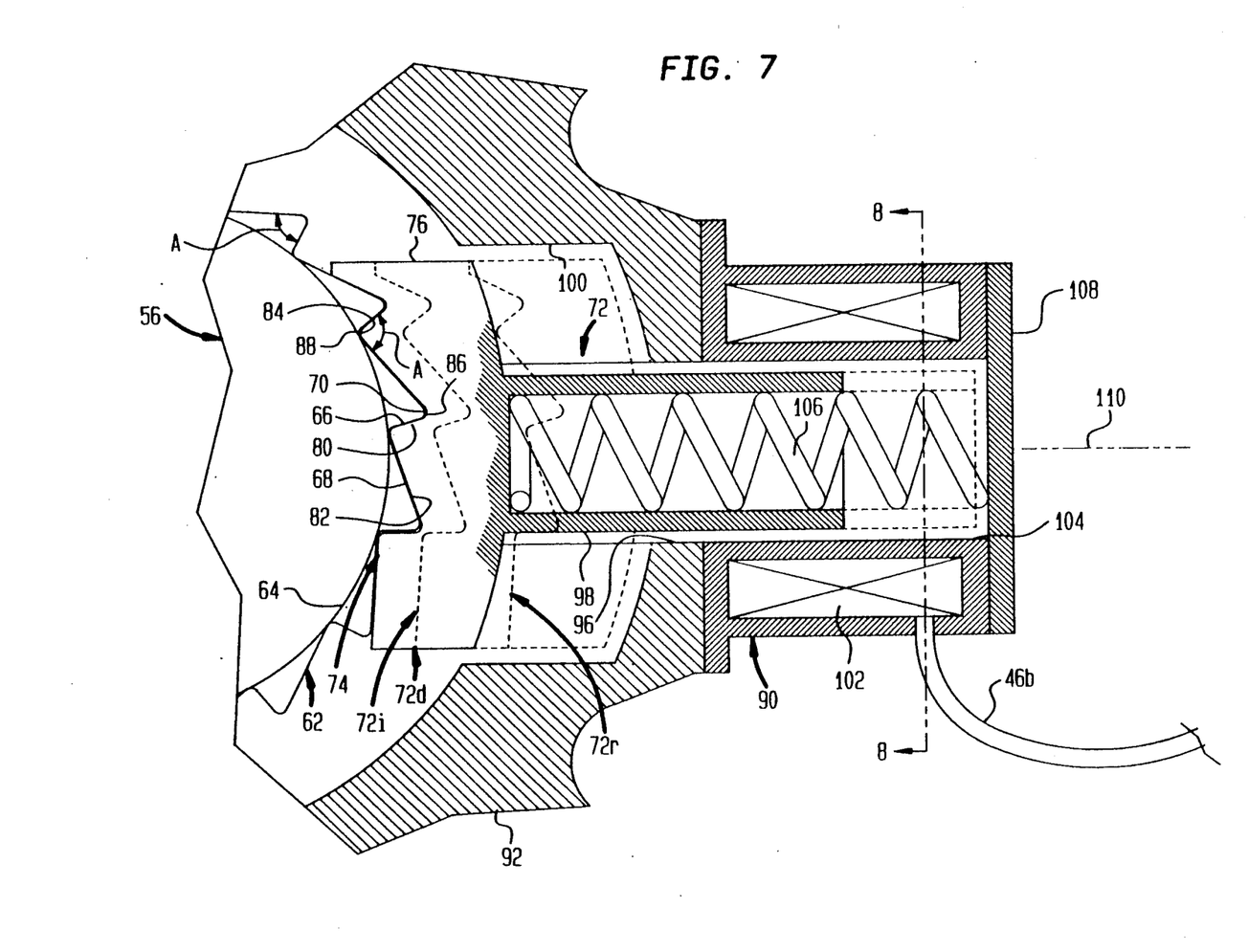
FIG. 7 is an enlarged transverse sectional view of a portion of the brake assembly illustrated in FIG. 4 shown in solid line with the brake member disposed in a deployed position.

As illustrated in FIGS. 5-7, the rotor tooth 62 is preferably complementary to the braking tooth 74, i.e., having mirror image configurations so that the rotor tooth locking surface 66 abuts the braking tooth locking surface 80, and the rotor tooth inclined surface 68 is disposed adjacent and parallel to the braking tooth inclined surface 82 in a brake member deployed position 72d shown in solid line in FIG. 7. In a preferred embodiment of the invention, the brake member base 76 includes a plurality of circumferentially spaced ones of the braking teeth 74, three being shown for example, with adjacent ones of the braking teeth 74 being joined together at generally V-shaped valleys 86 defined at the intersections of the inclined surfaces 82 and locking surfaces 80. Similarly, adjacent ones of the rotor teeth 62 are joined together at generally V-shaped valleys 88 defined at the intersections of the inclined surfaces 68 and the locking surfaces 66 as shown in FIG. 5. As shown in FIG. 6, the peaks 70 and 84 are received in the respective valleys 86 and 88 in the brake member deployed position 72d.

As illustrated in FIGS. 4 and 7, means 90 are provided for selectively positioning the brake member 72 in the deployed position 72d, shown in dashed line in FIG. 4, abutting the rotor disc perimeter 64 for allowing the braking tooth locking surface 80 to contact the rotor tooth locking surface 66 for preventing rotation of the rotor disc 56 and the shaft 24 in the clockwise, or first, direction. The positioning means 90 are also effective for positioning the brake member 72 in a retracted position 72r, shown in solid line in FIG. 4 and in dashed line in FIG. 7, spaced radially away from the rotor disc 56 for allowing the rotor disc 56 and the shaft 24 to rotate without restraint from the brake member 72. Identical positioning means 90 are used for positioning both the first and second brake members 72, 72b in the deployed and retracted positions, and therefore, the description of the positioning means 90 provided hereinbelow applies to both brake members.

Referring again to FIG. 4, the brake assembly 48 further includes an annular frame 92 fixedly joined to the housing 54 by a plurality of circumferentially spaced webs 94 preferably formed integrally therewith, by casting for example. As shown in more particularity in FIG. 7, the frame 92 includes a radially extending guide hole 96. The brake member 72 further includes an elongate, hollow plunger 98 which extends radially outwardly relatively to the centerline axis 28 from the base 76 in a direction opposite to that of the braking teeth 74. The plunger 98 is slidably joined to the frame 92 through the guide hole 96. The base 76 is sized preferably larger than the plunger 98 so that the plunger 98 may slide through the guide hole 96 in a radial direction until the base 76 contacts the frame 92 which thereby prevents further radial movement. The frame 92 may include a recess 100 having a configuration complementary to that of the base 76 for storing therein the base 76 when the brake member 72 is disposed in its retracted position 72r as illustrated in dashed line in FIG. 7.

Figure 8:
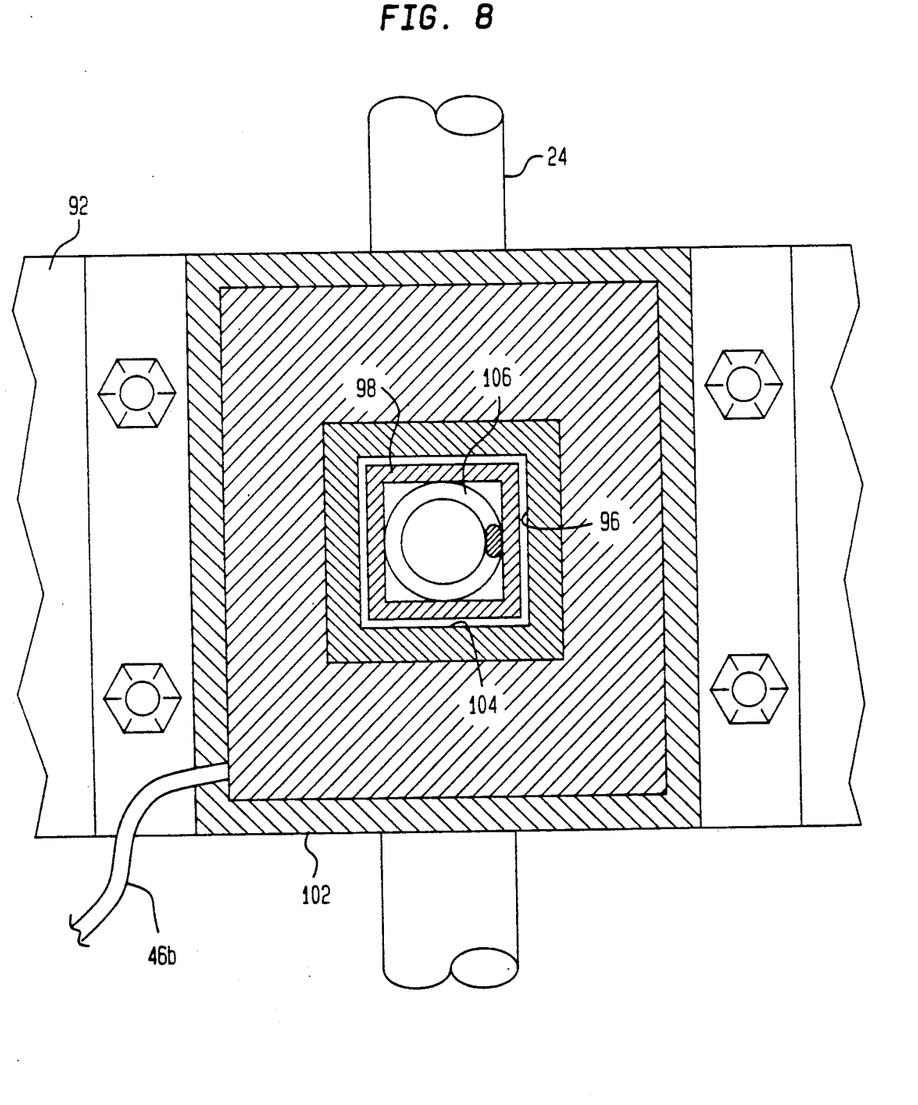
FIG. 8 is a transverse sectional view of the brake assembly illustrated in FIG. 7 taken along line 8—8.

In a preferred embodiment, the positioning means 90 includes a conventional tubular solenoid 102 fixedly joined to the frame 92, by bolts for example, as shown in FIG. 8. The solenoid 102 includes a central bore 104 disposed around the plunger 98. A compression spring 106 is disposed in the plunger 98 within the solenoid central bore 104 and is initially compressed between the base 76 and a retaining plate 108 suitably secured to the solenoid 102. The compression spring 106 is initially compressed for forcing the brake member 72 against the rotor disc 56 to engage the braking teeth 74 against the rotor teeth 62 in the brake member deployed position 72d when the solenoid 102 is preferably deenergized.

As shown in FIG. 7, with the brake member 72 engaging the rotor disc 56, the braking teeth locking surfaces 80 abut against the rotor teeth locking surfaces 66 preventing the rotor disc 56 and the shaft 24 from rotating in the clockwise direction. As described above, the clockwise direction is defined as that direction of rotation of the shaft 24 which will cause the ball nut 30 and the control rod 40 to be withdrawn from the vessel 10 as illustrated in FIG. 2 since the spindle 24 has right-handed threads 26. The counterclockwise, second, direction, opposite to that of the first direction is that direction of rotation of the shaft 24 which will cause the ball nut 30 and the control rod 40 to be inserted relative to the vessel 10.

When the solenoid 102 is predeterminedly energized by the control 44 through the electrical line 46b conventionally connected thereto, the solenoid 102 conventionally electromagnetically draws the plunger 98, which acts as an armature, further into the solenoid bore 104 and further compresses the spring 106 for positioning the brake member 72 in the retracted position 72r.

Accordingly, when the solenoid 102 is energized and deenergized, the plunger 98 slides in the guide hole 96 to the retracted position 72r and the deployed position 72d, respectively, for disengaging or engaging the rotor teeth 62 and the braking teeth 74, respectively. When the brake member 72 is held in its retracted position by the energized solenoid 102, the rotor disc 56 and the shaft 24 may be rotated without restraint from the brake assembly 48 in a conventional manner by the motor 42. When the brake member 72 is positioned in its deployed position 72d engaging the rotor disc 56 upon deenergization of the solenoid 102, clockwise rotation of the shaft 24 is positively prevented.

However, the positioning mean 90 also resiliently supports the braking teeth 74 since the brake member base 76 is supported on the compression spring 106. Accordingly, when it is desired to activate the motor 42 for rotating the shaft 24 in a counterclockwise direction for further inserting the control rod 40 into the vessel 10, this may be accomplished even with the brake member 72 engaged which adds to the safety features of the present invention. In this situation, counterclockwise rotation of the shaft 24 will cause the rotor teeth inclined surfaces 68 to displace radially outwardly the braking teeth inclined surfaces 82, and thereby the entire brake member 72, by a camming action until the rotor tooth peak 70 passes by the braking tooth peak 84 in a ratcheting fashion to intermittently free the rotor teeth locking surfaces 66 from the braking teeth locking surfaces 80. This allows the motor 42 to rotate the shaft 24 in the counterclockwise direction even though the brake member 72 is in its deployed position. FIG. 7 illustrates the brake member 72 in its deployed position 72d, its fully retracted position 72r, and in its intermediate position 72i shown in dashed line therebetween. The intermediate position 72i illustrates the maximum radial displacement of the brake member 72 from its deployed position 72d due to the counterclockwise movement of the shaft 24 just as one rotor tooth peak 70 passes an adjacent braking tooth peak 84, after which, the peak 84 will then be returned by the spring 106 adjacent to the next succeeding rotor tooth valley 88.

In the preferred embodiment of the present invention as illustrated in FIG. 8, the plunger 98 and guide hole 96 preferably have complementary, square axial cross-sections. These square cross-sections allow the plunger 98 to slide radially in the guide hole 96 but prevent any rotational movement thereof which is preferred for maintaining the circumferential alignment of the brake member 72 relative to the rotor disc perimeter 64. Other cross-sectional shapes could also be used including circular so long as effective means are provided for preventing rotation of the brake member 72 for maintaining alignment of the braking teeth 74 with the rotor teeth 62. Also in the preferred embodiment, the solenoid 102, including its central bore 104, is square in axial cross-section for more closely accommodating the square plunger 98. Of course, circular solenoids may alternatively be used.

As illustrated in FIG. 7, the plunger 98 includes a longitudinal centerline axis 110 which extends radially outwardly from the shaft centerline axis 28 so that the plunger 98 is disposed perpendicularly to the shaft centerline axis 28. The rotor and braking teeth locking surfaces 66, 80 preferably extend radially outwardly relative to the shaft centerline axis 28 for providing an increased amount of restraining torque from the braking teeth 74 against the rotor teeth 62. Since the brake member 72 includes a plurality, and in this example three, braking teeth 74, it is preferred that the rotor teeth locking and inclined surfaces 66, 68 and the braking teeth locking and inclined surfaces 80, 82 form respective obtuse angles A therebetween. The obtuse angle A is preferably generally close in value to 90°, and in an alternate embodiment of the present invention may even be 90°, to ensure that all of the plurality of braking teeth 74 on the brake member 72 engage respective rotor teeth 62 on the rotor disc 56 when the brake member 72 is deployed.

In the simplest form of the present invention, only one of the two brake members 72, 72b is required, and only a single braking tooth 74 is required. However, for increased redundancy and for decreasing reaction forces, a plurality of both braking teeth 74 and rotor teeth 62, and two brake members 72, 72b are preferred. The particular configuration of the respective rotor teeth 62 and braking teeth 74 may be determined for each specific design and is a function of the total number of teeth provided, the spacing therebetween, and the angle of the plunger 98 relative to the rotor disc 56. Alternate configurations of the rotor teeth 62 and the braking teeth 74 include for example symmetrical, isosceles-type teeth, as well as teeth 62, 74 wherein the angle A is less than 90°. In all designs, however, it is preferred that effective braking occur in the first, clockwise direction for preventing rotation due to the backflow occurrence, for example, while allowing rotation in the second, counterclockwise rotation by intermittently displacing the braking teeth 74 by the rotor teeth 62.

Accordingly, the brake assembly 48, in accordance with the preferred embodiment, provides complementary sawtooth profile rotor and braking teeth 62 and 74 which are effective for locking the shaft 24 and preventing rotation in preferably one direction, e.g., clockwise direction only, when the solenoid 102 is deenergized. This positive locking of the shaft 24 prevents rotation of the shaft 24 in the clockwise direction for preventing inadvertent withdrawal of the control rod 40 under the backflow occurrence, for example. When the solenoid 102 is energized, the brake member 72 is retracted from the rotor disc 56 allowing the shaft 24 to rotate, and then the motor 42 may be conventionally operated for predeterminedly either inserting or withdrawing the control rod 40.

The brake assembly 48 as described above thus provides a positive lock of the shaft 24 to prevent unintentional ejection travel of the control rod 40 from the vessel 10 while allowing for both insertion of the control rod 40 while the brake member 72 is disposed in the deployed position 72d, and allowing for relatively simple testing of the brake assembly 48.

More specifically, the brake assembly 48 may be simply tested by de-energizing the solenoid 102 for positioning the brake member 72 in the deployed position 72d and then energizing the motor 42 for clockwise rotation to allow the rotor teeth locking surfaces 66 to abut against, and be circumferentially restrained by the braking teeth locking surfaces 80 which prevents clockwise rotation of the shaft 24. Since the motor 42 will be unable to rotate the shaft 24 relative to the brake member 72 in the clockwise direction, the motor 42 will stall, which may be conventionally observed by the control 44 for indicating the effective operation of the brake assembly 48. If the brake assembly 48 is unable to prevent the clockwise rotation of the shaft 24 during testing, the control 44 can conventionally provide a suitable indication thereof, which may then result in manual inspection of the brake assembly 48 for correcting any problem that might exist.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A brake assembly for a control rod drive for selectively preventing travel of a control rod in a nuclear reactor vessel comprising:
   a shaft having a longitudinal centerline axis;
   means for translating said control rod upon rotation of said shaft;
   means for selectively rotating said shaft in a first direction and in a second direction, opposite to said first direction;
   a stationary housing having a central aperture receiving said shaft;
   a frame fixedly joined to said housing and having a guide hole;
   a rotor disc fixedly connected to said shaft for rotation therewith and having at least one rotor tooth extending radially outwardly from a perimeter thereof, said rotor tooth having a locking surface and an inclined surface extending therefrom in a circumferential direction;
   a brake member disposed adjacent to said rotor disc perimeter and including a base, at least one braking tooth having a locking surface extending radially inwardly from said base and an inclined surface extending therefrom in a circumferential direction, and a plunger extending radially outwardly from said base and slidably joined to said frame through said guide hole;
   said rotor tooth and said braking tooth being complementary to each other; and
   means for selectively positioning said brake member in a deployed position abutting said rotor disc perimeter for allowing said braking tooth locking surface to contact said rotor tooth locking surface for preventing rotation of said shaft in said first direction, and in a retracted position spaced radially away from said rotor disc for allowing said rotor disc and said shaft to rotate without restraint from said brake member, said positioning means including a tubular solenoid fixedly joined to said frame and having a central bore disposed around said brake member plunger and effective for sliding said brake member plunger relative to said frame for positioning said brake member in said deployed and retracted positions.

2. A brake assembly according to claim 1 wherein said positioning means in effective for resiliently supporting said braking tooth for allowing said rotor tooth inclined surface to displace said braking tooth inclined surface to intermittently free said rotor tooth locking surface from said braking tooth locking surface for allowing said shaft to rotate in said second direction when said brake member is in said deployed position.

3. A brake assembly according to claim 2 wherein said rotor disc includes a plurality of said rotor teeth spaced circumferentially around said rotor disc perimeter.

4. A brake assembly according to claim 3 wherein said brake member base is arcuate and includes a plurality of said braking teeth spaced circumferentially thereon.

5. A brake assembly according to claim 4 further comprising two of said brake members including first and second, circumferentially spaced brake members, and said positioning means is effective for positioning both said first and second brake members in said deployed and retracted positions.

6. A brake assembly according to claim 5 wherein said first brake member is spaced about 180° from said second brake member.

7. A brake assembly according to claim 4 wherein said rotor tooth locking and inclined surfaces form an obtuse angle therebetween.

8. A brake assembly according to claim 4 wherein said plunger is hollow and said positioning means further includes:
a spring disposed in said brake member plunger and being initially compressed for engaging said braking tooth against said rotor tooth in said brake member deployed position when said solenoid is deenergized; and
said solenoid being energizable for electromagnetically drawing said plunger further into said solenoid bore and further compressing said spring for positioning said brake member in said retracted position.

9. A brake assembly according to claim 8 wherein said plunger is disposed perpendicularly to said shaft longitudinal centerline axis.

10. A brake assembly according to claim 9 wherein said rotor tooth locking and inclined surfaces form an obtuse angle therebetween.

11. A brake assembly according to claim 9 wherein said rotor tooth locking surface is disposed at an angle of 90° relative to said rotor tooth inclined surface.

12. A brake assembly according to claim 8 wherein said plunger and said guide hole have complementary, square cross-sections.

* * * * *